Aug. 13, 1935.  R. F. DEVENER ET AL  2,011,355
FRONT WHEEL DRIVE
Filed March 14, 1931  4 Sheets-Sheet 2
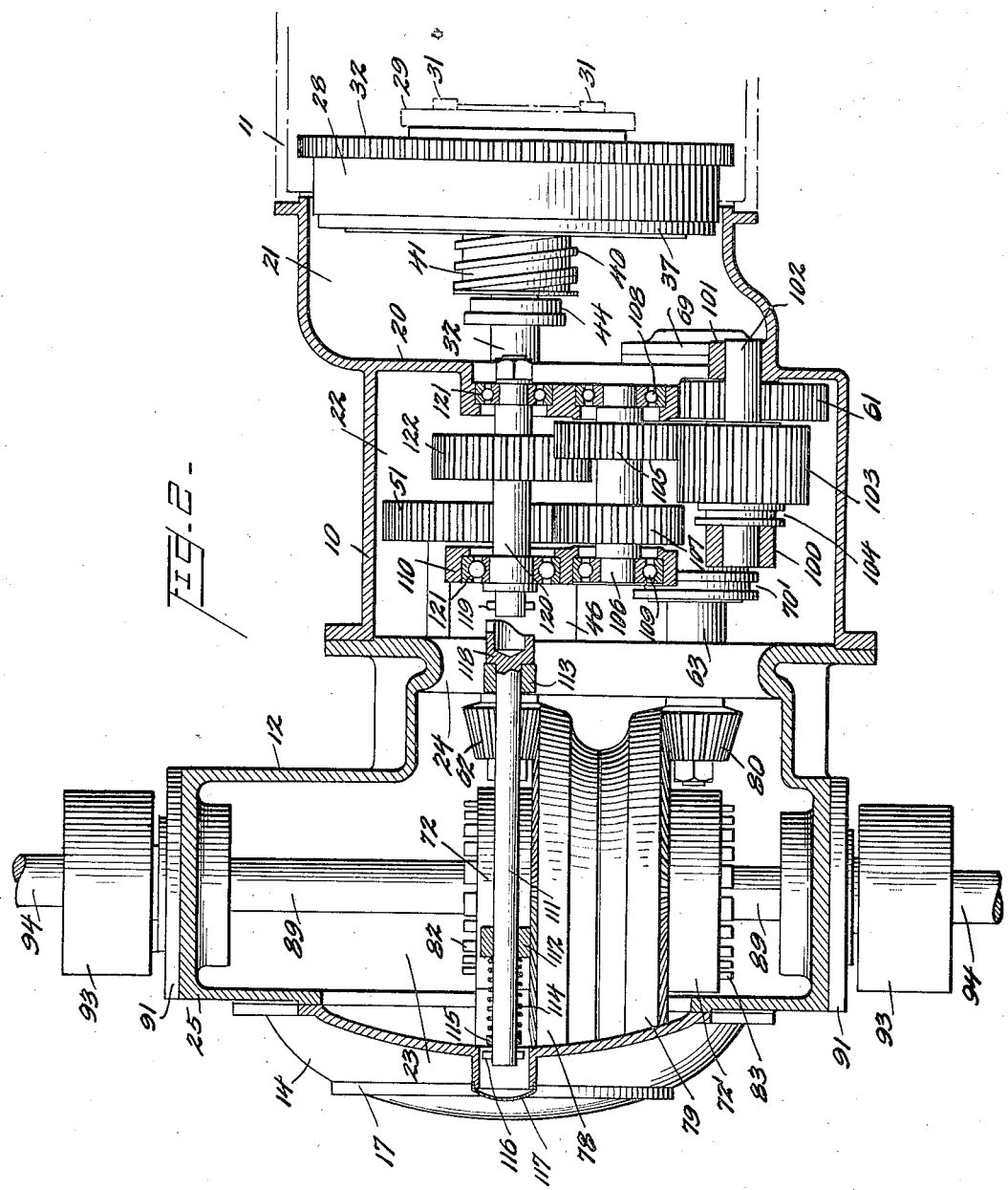
Inventors
R.F. Devener
R.H. Sheppard
By H.H. Snelling
Attorney Aug. 13, 1935.   R. F. DEVENER ET AL   2,011,355
FRONT WHEEL DRIVE
Filed March 14, 1931   4 Sheets-Sheet 3
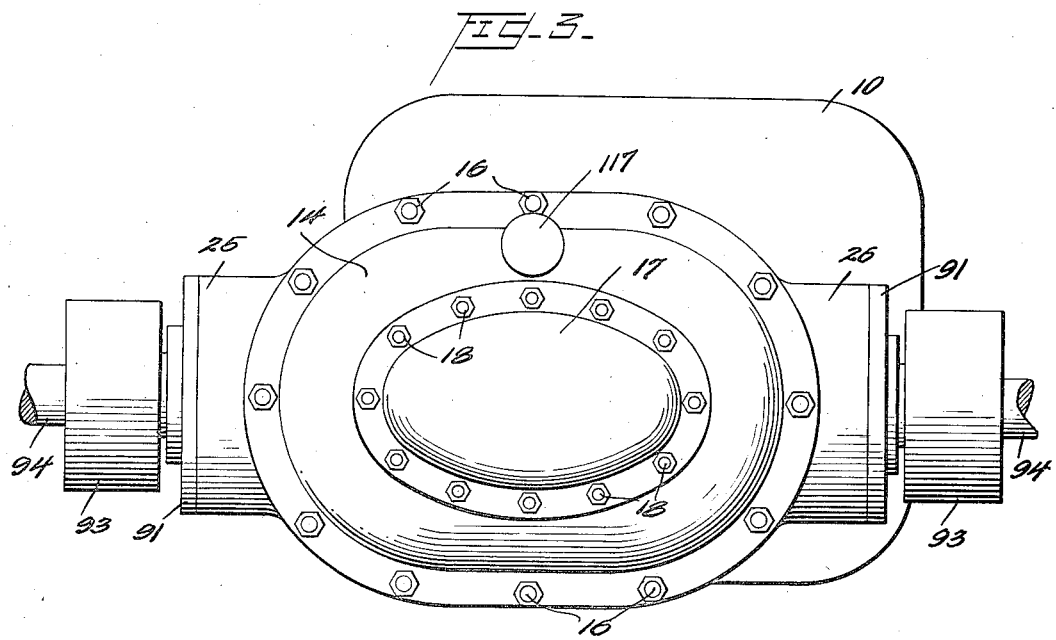
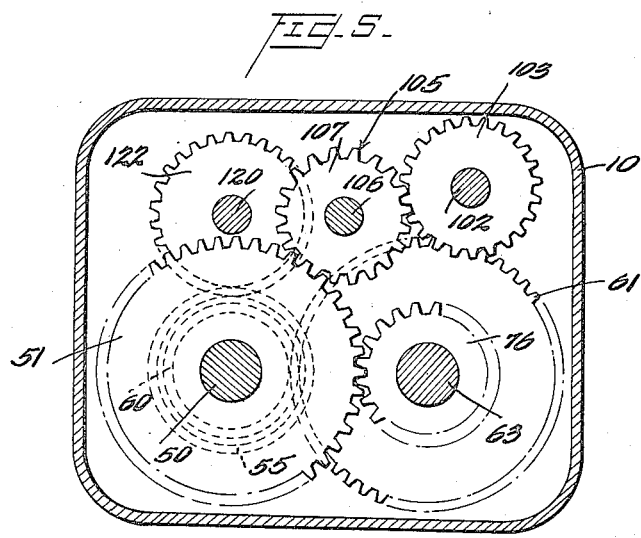
Inventors
R. F. Devener
R. H. Sheppard
By H. H. Snelling
Attorney

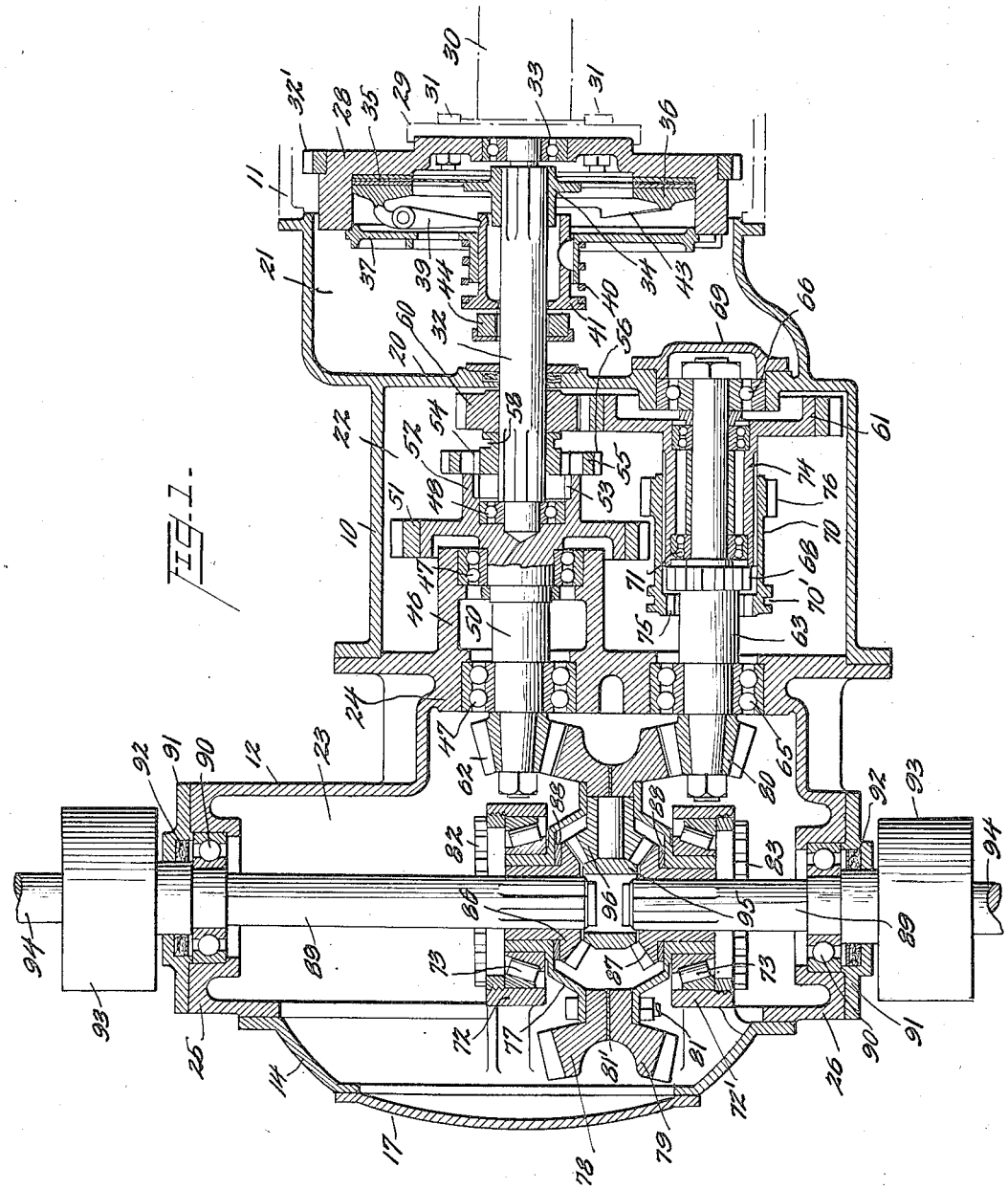

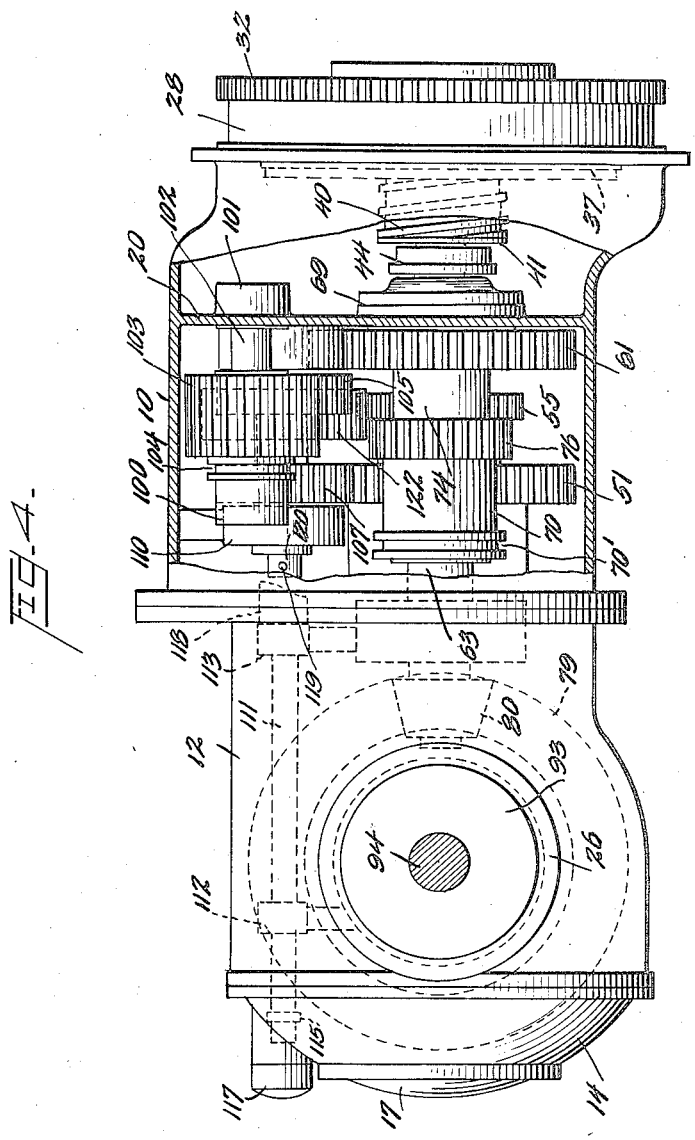

Patented Aug. 13, 1935

2,011,355

UNITED STATES PATENT OFFICE 2,011,355

FRONT WHEEL DRIVE

Raymond F. Devener and Richard Harper Sheppard, Hanover, Pa.

Application March 14, 1931, Serial No. 522,770

10 Claims. (Cl. 74—326)

This invention relates to automobile transmission particularly to the reduction and differential gearing of automobiles of which the two front wheels are driving wheels as well as steering wheels and wherin the entire transmission is arranged forwardly of the engine.

The principal object of the present invention is the provision of gearing for an automobile of the type stated, in which the parts are so arranged that the over-all distance from the rear of the engine to the far or front end of the drive is reduced to a minimum in order not only to make more room available for the passengers in a car of a given wheel base but also to improve most materially the general configuration and pleasing effect of the automobile as viewed from the side.

A further object of the invention is so to construct and position the ring gear of the differential that it will be directly engaged by a second speed drive pinion as well as by the usual high speed drive pinion, thereby permitting the primary and secondary shafts to be parallel and in the same horizontal plane, in such manner utilizing to the best advantage the space which is available for the reduction gearing, also as a matter of fact somewhat simplifying the construction.

Other and further objects of the invention have to do with the specific arrangement of the various shafts and gears, all tending to a simplification of the mechanism, ease of access for adjustment without disassembling the entire mechanism, and a more convenient and sturdier mounting of the various shafts including particularly the arrangement of the shafts in parallel relation both horizontally and vertically.

In the drawings:—

Figure 1 is a horizontal section taken in a plane containing the axes of the clutch, primary and secondary shafts as well as the two front axles.

Figure 2 is a horizontal section taken on a plane above all of the gearing but showing the housing in cross section.

Figure 3 is a front elevation indicating the relative positions of the shaft axes.

Figure 4 is a side elevation.

Figure 5 is a transverse vertical section thru the transmission.

For some reason most workers in this art, instead of designing a transmission specifically intended for front wheel drive, have attempted to modify some ordinary rear wheel drive in such fashion that it can be installed forwardly of the engine but obviously these transmissions of conventional rear drive type interfere seriously with the efficiency of the cooling system of the engine for they locate the engine fan and the radiator at a point entirely too far from the engine.

The conventional rear drives, if not altered, are unsuited for the front wheel drives, which undoubtedly will become standard practice in a very few years, because of the lack of space available. The proposal to increase the wheel base has not met with approval because under these circumstances either the wheel base is so long as to make the car appear very awkward, or the engine must protrude into the driver's space and this will interfere with convenience in driving.

For these various reasons it seems almost essential that the front wheel drive, to be successful, must depart materially from rear wheel practice and must be designed along different lines from the conventional rear wheel drives now in use. By doubling the ring gear of the differential and having this member simultaneously mesh with both the primary and secondary shafts and installing above these two shafts other cooperating shafts the wheel base can be kept easily within such length as to improve rather than detract from the pleasing lines of the car as a whole.

Referring now particularly to Figure 1, the housing consists of a transmission housing 10 bolted to and forwardly of the engine housing 11, a differential housing 12 forming the larger part of the front section, a carrier 14 which is a bowl-like member secured to the front flat face of the differential housing by means of bolts 16 and is itself closed by a cap 17 of oval shape, which may readily be taken off, for inspection and adjustment of the parts, by removal of the bolts 18.

The transmission housing 10 has a central vertical partition 20 dividing this housing into a clutch chamber 21 at the rear and a transmission chamber 22, the latter being the central chamber of the complete housing, the forward or differential chamber 23 being closed at its rear by a vertical partition 24 which is an integral part of the differential housing 12 and the front part of this chamber 23 is closed by the carrier and the cap, the two ends being formed by cylindrical extensions 25 and 26 extending laterally from and integrally with the differential housing.

Within the chamber 21 is mounted the fly wheel 28 secured to the head 29 of the engine crank shaft 30 by the bolts 31 and therefore being to all intents and purposes an integral part of the shaft 30 receiving its sole support from the bearings of that shaft and preferably carrying a gear 32' designed to mesh with some standard form of electrical starting device, the latter forming no part of this invention.

The propeller or clutch shaft 32 is mounted at its rear end in an anti-friction bearing 33 carried by the fly wheel 28 and on this shaft 32 is mounted a hub 34 carrying a clutch disk 35 which is caused to rotate with the fly wheel 28 by means of the conventional disk type clutch plate 36 when the latter is in the position shown, that is, when the pressure levers 39 are pressing the plate 36 with the full strength of the spring 40 which is shown as fully expanded, the rear end resting against the clutch cover which during driving rotates with the fly wheel, and the front end of the spring 40 has urged the release sleeve 41 into driving position. The extent of full pressure of the clutch plate 36 against the clutch disk 35 is regulated by rotating the clutch cover 37 with respect to the cam surfaces 43 of the clutch plate so that as the clutch disk becomes worn new adjustments can readily be made.

When the driver depresses the clutch pedal (not shown) the release bearing 44 moves backward, that is, to the right as seen in this figure, and this action moves the release sleeve 41 in the same direction, compressing the spring 40, moving the long arms of the pressure levers 39 rearwardly while moving the shorter clutch plate engaging arms forwardly, thereby freeing the clutch disk 35 from engagement with either the clutch plate 36 or the friction surface carried by the fly wheel 28 so that, as is standard in devices of this kind, the engine and fly wheel can rotate without transmitting motion to the clutch shaft 32.

Considering now the middle or transverse chamber 22 with its rear wall 20 and its front wall 24 which latter includes a rearwardly extending hollow hub 46 made sufficiently strong to receive the spaced ball or roller bearings 47 which directly support the primary shaft 50 and indirectly, thru the anti-friction bearings 48, support the forward end of the clutch or propeller shaft 32. The primary shaft has near its rear end a low speed gear 51 the hub 52 of which is counterbored to receive the anti-friction bearing 48 and is internally toothed or grooved as at 53 so as to mesh with cooperating teeth or grooves 54 on the sliding high speed clutch 55 which latter on its periphery carries a series of annular teeth 56 which are constantly in mesh with a hand crank drive gear 122 located directly above, and not shown in this figure but is shown in Figs. 2, 3 and 4.

The annular groove 58 in clutch 55 is engaged by a fork, not shown, on the hand control lever so that this gear 55, which is slidable on the clutch shaft 32, may be moved forwardly from its idle position shown, into engagement with the extensions which carry the teeth 53 so as to lock the primary and clutch shafts together. Fast to the clutch shaft 32 behind the high speed clutch 55 is a somewhat smaller gear, the transmission main drive pinion 60, constantly in mesh with the transmission driven gear 61 to be described later. Within the differential chamber 23 and fast on the reduced end of the primary shaft 50 extending into such chamber is the high speed drive pinion 62, which pinion transmits power to the differential in both high and low gear as well as in reverse.

The secondary shaft 63 is somewhat longer than the primary shaft 50, lies parallel to it with its axis in the same horizontal plane, is mounted in the parallel partition walls 24 and 20 by the roller or ball bearings 65 and 66 respectively, and carries between these bearings a second-speed driven clutch member 68 which we much prefer to have integral with the shaft. A blind cap 69 within the clutch of fly wheel chamber 21 permits ready removal, and insertion of the secondary shaft in place. Altho the secondary shaft 63 supports the transmission driven gear 61 which is constantly in mesh with the gear 60 fast on the clutch shaft, the secondary shaft itself does not revolve with it except upon sliding movement of the low speed sliding clutch sleeve 70, here shown as in neutral position.

Upon ball or roller bearings 71 on secondary shaft 63 is mounted the integral hub 74 extending forwardly from the transmission driven gear 61, the latter slidingly carrying the clutch sleeve 70 which constantly rotates with the gear 61 and which may be moved rearwardly from the position shown, in which case the integral clutch member 68 on the secondary shaft is in engagement with the internal clutch teeth 75 on the clutch sleeve 70. Upon movement of the clutch 70 in the opposite direction, that is, forwardly, the teeth 76 at the rear of the sleeve mesh with the teeth on the low speed driven gear 51, such movement of the clutch sleeve 70 being affected by engagement of the fork, not shown, of the hand controlled lever in the annular groove 70' of the clutch sleeve 70.

At the forward and reduced end of the secondary shaft 63 is a drive pinion 80 similar to and interchangeable with the pinion 62 and like it positioned within the differential chamber 23. The pinion 80, however, is a drive member only when the transmission mechanism is in second gear altho this pinion and the secondary shaft on which it is mounted constantly revolve whenever primary shaft 50 is turning.

From the carrier 14 extend rearwardly two cages 72 and 72' within which are conical roller bearings 73' upon which are mounted the differential assembly 77 which carries the two interchangeable ring gears 78 and 79, high and second respectively, which gears are so spaced back to back that they correctly engage the pinions 62 and 80 respectively, the adjustment being secured by means of shims 81' thru which and the two ring gears are passed the retaining bolts 81. Not only must the distance apart of the two back-to-back ring gears be exactly regulated but the differential assembly itself must be positioned with great accuracy and to this end we provide the differential bearing adjusting nuts 82 and 83 which centralize the differential between the high and second speed pinions 62 and 80.

Within the differential assembly are the differential side gears 86 and 87 each having the usual side gear thrust washers 88. As customary, these differential side gears are each internally splined to receive and support the correspondingly grooved portions of the opposed inner ends of the front axles 89 each mounted near the far end in anti-friction bearings 90 in the inturned hub of a barrel shaped portion 25 or 26 of the differential housing. Beyond these bearings 90 at each side is a circular closure plate 91 carrying the usual packing 92 and beyond these closure plates are the universal joint housings 93 and the spindles 94. The differential spider 95 carries the spider pinion 96 which engages the two side gears 86 and 87 so that except for the provision of the back-to-back ring gears the differential assembly follows somewhat closely standard practice.

Having reference now to Figure 2 which, it will be remembered, shows primarily the mechanism located above the gearing already described, there is a bearing in a bracket 100 extending downwardly from the upper wall of the transmission housing and a bearing 101 in the vertical partition wall 20, in which is mounted a shaft 102 which need not revolve but upon which is slidably and rotatably mounted a wide gear 103 shown in the figure as in neutral but which may be caused to slide rearwardly by means of the reverse fork, not shown, which engages the annular groove 104 so as to cause gear 103 to mesh with the rather large diameter transmission driven gear 61 directly below it. Upon such movement of the operating lever the idle gear 103 revolves with the clutch shaft 32 and since this idle gear 103 is at all times in mesh with gear 105 fast upon shaft 106, gear 107, also upon that shaft, is revolved and this latter gear, 107, is constantly in mesh with low speed gear 51 which is an integral part of primary shaft 50.

Shaft 106 is mounted in anti-friction bearings 108 in the vertical wall 20 at the rear and at the front in similar bearings 109 in bracket 110 extending downwardly from the top wall of the transmission housing 10. It is thru these gears just described that we obtain a reverse drive, the complete train being as follows: crank shaft 30, clutch disk 35, clutch shaft 32, gear 60 fast on shaft 32, gear 61 rotatably mounted on secondary shaft 63, idle gear 103 directly above gear 61, members 105, 106 and 107 which always rotate together, and low speed gear 51 which does not lie directly below gear 107 but, as will be seen from Figure 5, lies below but to the left of this gear and its shaft. The train then continues thru primary shaft 50, and pinion 62 to the ring gear of the differential.

For normal starting the gear 32' is used but we have provided convenient hand starting mechanism consisting of a shaft 111 mounted in bearings 112 and 113. The shaft 111 is normally pressed by a spring 114 engaging a collar 115 fast on the shaft so as to present its transverse pin 116 in convenient position to be engaged by the hand crank, to use which the readily detachable cap 117 is removed. Forward movement of the hand starting shaft 111 under urge of its spring is limited by engagement of the one-way clutch jaw 118 with bearing 113. This jaw, when the hand starting shaft 111 is moved rearwardly, engages a pin 119 on shaft 120 mounted in spaced bearings 121 and carrying gear 122 directly above and constantly in mesh with the peripheral teeth 56 on the sliding high speed clutch 55, the latter being very much narrower in a fore and aft direction than is gear 122, thus preserving at all times the meshing relation.

Rotation of the hand starting shaft 111 while it is pressed rearwardly therefore revolves clutch shaft 32, and thru it, the crank-shaft of the motor. While differing from usual practice in requiring that the clutch shall be engaged in starting, this offers no disadvantage whatsover since at this time the high speed clutch will obviously be in the position shown in Figure 1 as will also be the second speed clutch 70, consequently there is no possible chance of the automobile moving upon the starting of the engine even tho the clutch is engaged.

What we claim is:—

1. A two-piece housing for close coupled transmission and differential mechanisms in which the transmission mechanism includes longitudinal shafts, said housing comprising a transmission enclosing portion having two open ends and a transverse vertical wall intermediate said ends, a differential housing portion having a vertical wall transverse of and engaging said transmission enclosing portion for closing one of said open ends, and bearings for said longitudinal shafts located in alined relation in the two vertical walls.

2. In combination, a drive shaft, a differential gear, a first driven shaft, a second driven shaft parallel to and spaced from the first driven shaft and coaxial with the drive shaft, a clutch for at will connecting the drive shaft to the coaxial shaft and means including said clutch for driving the differential gear at high speed from the drive shaft thru said second driven shaft at high speed, a sliding member on the first driven shaft, means including said member for driving the differential gear at low speed from the drive shaft thru said second driven shaft, and means including said member for driving the differential gear at intermediate speed from the drive shaft.

3. In a transmission mechanism, two parallel laterally spaced driven shafts in the same horizontal plane, a high speed driving wheel on one shaft, a second speed driving wheel on the other shaft, means on both shafts for driving the high speed driving wheel at low speed, and means turning independently of said other shaft and including two parallel shafts both above said horizontal plane, for reversing the direction of rotation of one of said driving wheels.

4. In a transmission mechanism, two parallel transverse housing walls, alined anti-friction bearings in the two walls, a shaft extending from one bearing thru the other, carrying on its extended end a driving pinion and carrying between said bearings a clutch, a pair of spaced bearings on said shaft, a gear having a hub mounted on said pair of bearings, a clutch sleeve splined to said hub and slidable to engage at will the clutch between the bearings.

5. In combination, a drive shaft, a gear constantly driven thereby, a gear slidable into and out of mesh with said gear a driven shaft having a gear fixed thereto, a counter shaft having thereon two fixed gears, one constantly meshing with the driven shaft gear and the other constantly in mesh with said slidable gear.

6. A transmission and differential case of two separable housings, one of which is provided with bearing supports to receive the front ends of solid parallel horizontal shafts, a spaced cylindrical bearing support on said housing to receive a central portion of one of said shafts, a bearing support in the rear wall of the other housing to receive the rear end of the other shaft, differential gearing, and change speed mechanism, including said shafts, meshing with said differential gearing.

7. In a transmission mechanism for motor vehicles, the combination with a differential mechanism and a change speed mechanism including a driven shaft, of two separable housings respectively inclosing said mechanisms, a common wall between said housings and integral with the differential housing, and a support for spaced bearings for said driven shaft carried by said wall, and a gear on said shaft on each side of said spaced bearings, said shaft being carried entirely by said spaced bearings.

8. The combination with a drive shaft, of a driven shaft connected thereto by permanently meshed gears, a second driven shaft coaxial with said drive shaft and clutch means for directly connecting it thereto, a third driven shaft coaxial with said first mentioned driven shaft and clutch means for directly connecting said first and third driven shafts, said last mentioned clutch means carrying a gear for connecting said first and second driven shafts.

9. In a transmission mechanism, a separable two part housing, a wall dividing the housing into two chambers, a pair of spaced bearings supported in said wall, a driven shaft entirely supported in said bearings, a gear on each end of said shaft adjacent the bearings, said bearings being between said gears, and a third bearing carried in one end of said shaft for journaling a drive shaft carried in said housing.

10. In a transmission mechanism, a separable two part housing, two division walls transverse of the housing, speed change mechanism between the division walls comprising a pair of laterally spaced parallel shafts journaled in said walls, one of said shafts consisting of two coaxial parts, clutch means for directly connecting said coaxial parts and a second clutch means on the other shaft for connecting the same to one of said coaxial parts in one position and for connecting the other of said parallel shafts to the other of said coaxial parts in driving relation in a second position.

RAYMOND F. DEVENER.
RICHARD HARPER SHEPPARD.